United States Patent [19]
Wang

[11] Patent Number: 5,938,959
[45] Date of Patent: Aug. 17, 1999

[54] OVEN WITH AUTOMATICALLY MOVABLE SHELF

[75] Inventor: Ping Wang, Benicia, Calif.

[73] Assignee: Testrite Baparoma International LLC, Benicia, Calif.

[21] Appl. No.: 09/056,900

[22] Filed: Apr. 7, 1998

[51] Int. Cl.[6] .............................. A21B 1/24; A21B 1/50; A21B 1/02; A21B 1/08

[52] U.S. Cl. ......................... 219/401; 219/395; 219/403; 219/404; 126/20

[58] Field of Search ..................................... 219/401, 394, 219/395, 403, 404, 453.11; 126/337 A, 337 R, 339, 20, 33; 99/417, 467; 426/510, 511

[56] References Cited

U.S. PATENT DOCUMENTS

| | | | |
|---|---|---|---|
| 1,657,226 | 1/1928 | Neldner | 126/337 A |
| 2,573,115 | 10/1951 | Sisto | 99/450 |
| 2,683,795 | 7/1954 | Sheidler et al. | 219/395 |
| 2,868,190 | 1/1959 | Reeves | 126/337 A |
| 2,885,526 | 5/1959 | Paulding | 219/394 |
| 2,919,691 | 1/1960 | Rinaldo et al. | 126/337 A |
| 2,994,760 | 8/1961 | Pecoraro et al. | 219/394 |
| 3,030,486 | 4/1962 | Lashley | 219/394 |
| 3,043,290 | 7/1962 | Smith | 126/337 A |
| 3,059,634 | 10/1962 | Brinkman et al. | 126/337 R |
| 3,976,000 | 8/1976 | Oxel | 126/338 |
| 4,123,969 | 11/1978 | Abbate | 99/467 |
| 4,164,643 | 8/1979 | Peart et al. | |
| 4,238,669 | 12/1980 | Huntley | |
| 4,345,513 | 8/1982 | Holt | |
| 4,357,513 | 11/1982 | Kawata et al. | |
| 4,476,848 | 10/1984 | Protas | |
| 4,488,025 | 12/1984 | Tanabe | |
| 4,596,914 | 6/1986 | Morino | |
| 4,629,850 | 12/1986 | Tanabe | |
| 4,746,785 | 5/1988 | De Longhi | |
| 4,780,597 | 10/1988 | Linhart et al. | 219/404 |
| 5,404,935 | 4/1995 | Liebermann | 219/387 |
| 5,429,043 | 7/1995 | Becker | 126/337 A |
| 5,487,328 | 1/1996 | Fujii | |
| 5,534,681 | 7/1996 | Hwang | |
| 5,618,458 | 4/1997 | Thomas | 219/394 |
| 5,693,246 | 12/1997 | Han et al. | |
| 5,776,532 | 7/1998 | Wang | 426/511 |
| 5,800,853 | 9/1998 | Wang | 426/511 |

*Primary Examiner*—Jospeh Pelham
*Attorney, Agent, or Firm*—R. Neil Sudol; Henry D. Coleman

[57] ABSTRACT

A domestic oven includes a housing defining a cooking chamber, at least one stationary first heating element in the chamber, a shelf movably disposed in the chamber, a second heating element mounted to the shelf, and a drive operatively connected to the shelf for translating the shelf, together with the second heating element, in the housing. The shelf is made of heat conductive metal. A temperature sensor in heat conductive contact with the shelf senses the temperature of the shelf and of a metal tray or pan placed on the shelf in heat conductive contact therewith. The temperature sensor is operatively connected to an energization circuit for the second heating element for de-energizing the second heating element upon detecting a sudden rise in temperature. The second heating element is mounted to the shelf via insulating spacers. The oven is used to perform a hybrid steaming and baking method.

46 Claims, 6 Drawing Sheets

OVEN WITH AUTOMATICALLY MOVABLE SHELF

BACKGROUND OF THE INVENTION

This invention relates to domestic ovens and to a related cooking technique. The invention applies particularly to countertop electric ovens.

There are many electric countertop ovens, including toaster ovens and convection ovens, available on the market today for domestic uses. Almost every oven is claimed to be multi-functional, including functions of baking, broiling, baking and broiling, and/or toasting. However, the final quality of a baked product can be dependent upon not only the cooking mode but also the position of the product in an oven and the nature as well as the physical dimensions of the product. Many ovens have multiple slots at different levels for alternately receiving a shelf or a rack, thereby providing adjustability in the vertical position of the shelf or rack. The shelf or rack can be manually raised or lowered before a cooking procedure so that a food article is subjected to appropriate thermal treatment on both upper and lower surfaces.

It is often more desirable to have an adjustable shelf for supporting a metal pan (baking pan, roasting pan, grill pan, etc.) on which a food product is placed, wherein the shelf is continuously adjustable to any vertical position during a coking process. When on-line height adjustment is not necessary during a cooking cycle, the shelf can be adjusted to an optimal height before the oven power is switched on. When a faster rate of heat transfer to a lower surface of a food item is required only at the beginning of a cooking cycle, the shelf can first be positioned closer to the bottom of an oven and subsequently raised to a higher position.

Most conventional dometic ovens have two sets of heating elements disposed in opposition to one another, for instance, at the top and the bottom of an oven chamber. In order to develop necessary crust and surface browning on the bottom layer of a food product, it is important to have enhanced heat transfer to the bottom layer especially when the food product is placed on a non-perforated metal pan. When multiple slices of white bread are placed on a non-perforated bread pan and toasted in a countertop electric oven, for example, the bottom side of the multiple slices remains wet and white while the upper side turns brown and crispy. This difference in browning is due to the fact that the water vaporization rate at the lower surface of the bread is much lower than that of the upper surface.

Another typical example is the use of a countertop oven for re-heating of leftovers such as pizza slices. Without enhanced heat transfer from the lower surface, the surface could be soggy as the upper surface quickly turns brown when the pizza slices are placed on a non-perforated metal pan. Adjusting the shelf, metal pan and the food product to the lowest possible position in an oven would improve but would not solve the problem.

OBJECTS OF THE INVENTION

An object of the present invention is to provide an improved oven and/or an associated cooking process.

It is a further object of the present invention to provide an oven with increased versatility.

Another object of the present invention is to provide an oven wherein heat transfer to a bottom surface of a food product, particularly a food product on a metal tray or pan, is enhanced to thereby so that the bottom surface is cooked to a degree matching that of an upper surface.

An additional object of the present invention is to provide an oven which is useful in a hybrid steaming and baking process wherein a food article is first subjected to steam and subsequently subjected solely to baking.

These and other objects of the present invention will be apparent from the drawings and descriptions herein.

SUMMARY OF THE INVENTION

The above objects are attained in a domestic oven comprising a housing defining a cooking chamber, at least one stationary first heating element in the chamber, a shelf movably disposed in the chamber, a second heating element mounted to the shelf, and a drive operatively connected to the shelf for translating the shelf, together with the second heating element, in the housing.

The shelf can take any number of specific forms, including a grating, a rack or a lattice. Preferably, the shelf is made of heat conductive metal. A temperature sensor in heat conductive contact with the shelf senses the temperature of the shelf and of a metal tray or pan placed on the shelf in heat conductive contact therewith. The temperature sensor is operatively connected to an energization circuit for the second heating element for de-energizing the second heating element upon detecting a sudden rise in temperature. The second heating element is advantageously mounted to the shelf via insulating spacers. This facilitates the detection of the temperature of the tray or pan rather than of the second heating element itself. The transfer of heat from the tray or pan to the metal shelf is facilitated where the shelf is provided with a plurality of land surfaces for receiving the tray or pan. It is contemplated that the land surfaces define a horizontal plane and that the second heating element is disposed on top of the shelf, with the second heating element having an upper surface or rim located in approximately the plane of the land surfaces. This configuration maximizes immediate heat transfer between the second heating element and the lower surface or panel of the tray or pan.

In accordance with another feature of the present invention, a recess is provided in or on the shelf for receiving the temperature sensor so that the sensor is in heat conductive contact with the shelf. The recess may be defined by a heat-conductive sleeve attached to the shelf.

Preferably, the shelf and the drive are operatively connected to one another for reciprocating the shelf in a vertical direction in the chamber. The drive includes a motor mounted to the housing and disposed outside the chamber, the housing being provided with at least one vertical slot communicating with the chamber and traversed by a drive rod connected to the shelf. The slot is provided with a self-sealing closures made, for instance, of polymeric material, for reducing heat loss.

In accordance with a further feature of the present invention, a baking pan is disposed on the shelf. The baking pan includes a steam generating chamber and at least one aperture in an upper surface in communication with the steam generating chamber for delivering steam to a lower surface of a food article placed over the aperture. In a specific embodiment of the baking pan, a lower pan part and an upper pan part are connected to one another via a steam tight seal, while the upper pan part is provided with an opening and a replaceable panel provided with the aperture is mounted in a steam-tight fit in the opening. The temperature sensor is particularly useful for automatically de-energizing the second heating element upon detecting a sudden rise in temperature. Such a temperature rise would occur when water placed in the steam generating chamber has been converted entirely into steam.

Preferably, each heating element in the oven is provided with a dedicated energization circuit. Thus, each heating element is separately controllable to carry out a respective cooking program. In many cooking processes, the energization circuits are operated in a coordinated manner to effectuate a controllably simultaneous or staggered heating of a food article. For example, an energization circuit may be operatively connected to the first heating element for energizing the first heating element during a baking cycle overlapping a steaming cycle and continuing after termination of the steaming cycle by the temperature sensor. In addition, a microprocessor may be provided for controlling not only the functioning of the energization circuits but also the activation of the shelf drive. In response to input from the temperature sensor and instructions from a keypad, a dial or other input device, the microprocessor controls the energization of the heating elements and the movement of the shelf. Preprogrammed cooking sequences, stored in a memory of the microprocessor, may be followed to cook food items of known composition and size or weight.

Generally, the baking pan includes a lower panel provided with a recess communicating with the steam generating chamber and receiving a predetermined quantity of water prior to a steaming and baking operation in the housing. Moreover, the upper surface may be provided with a depression, with the aperture being located in the depression.

In another embodiment of the present invention, the second heating element is incorporated into a tray or pan and is removably mounted to the shelf. More specifically, the second heating element is incorporated into a lower part of the tray or pan which defines, together with an upper part a steam generating chamber. The second heating element and the shelf are provided with mating electrical connectors for supplying electrical energy to the heating element.

In an alternative oven assembly in accordance with the present invention, a heating coil incorporated into a baking pan or tray is plugged into an electrical connector in an inside wall of an oven. In this oven assembly, the baking pan or tray is stationary with respect to the oven chamber.

In a cooking method in accordance with the present invention a tray or pan and a food article are disposed on a movable shelf in a domestic-type oven so that the food article is supported on the tray or pan and so that the tray or pan is in turn supported on the shelf. A drive is operated to automatically move the shelf together with a heating element in the oven. The heating element is energized while the food article is disposed on the tray or pan in the oven.

In a particular utilization of the method of the present invention, steam is generated in a chamber internal to the tray or pan and is dispensed through at least one aperture disposed in an upper surface of the tray or pan, the food article being positioned over the aperture. Prior to the generation of the steam, a predetermined aliquot of water is deposited into the chamber. The steam is generated from the aliquot of water mainly owing to heat from the heating element.

In another method step of the present invention, another heating element in the oven is energized while the food article is disposed on the tray or pan. That other heating element may located at a bottom of the oven, resulting in a baking of the food article, or above the shelf in the oven, resulting in a browning of an upper surface of the food article. Where the cooking method involves a steam generation step, the energizing of the other heating element occurs during and after the generating of the steam.

The food article may be deposited on the tray or pan prior to disposing the tray or pan, together with the food article, on the shelf in the oven. Alternatively, the tray or pan may be placed on the shelf prior to the deposition of the food article on the tray or pan. In addition, the shelf may be automatically moved before, during or after the energizing of the heating element and prior to or after the disposing of the tray or pan and the food article on the shelf.

The present invention thus solves the problem of uneven cooking of bottom and top surfaces of a food product by providing an additional heating element that is in close physical proximity to a lower side of a cooking tray or pan which holds the food product. This configuration enhances the heat transfer to the lower surface of the food product. The additional heating element can be connected to a timer, a thermostat and/or a power control switch to deliver an appropriate amount of energy to a desired location for a suitable period of time.

The versatility of a countertop oven can be further increased when the extra heating element is combined with or embedded in the adjustable shelf so that the extra heating element is strong enough to receive a metal pan as well as a food product(s) and the extra heating is continuously adjustable in terms of its position in an oven.

Having an additional heating element just beneath a baking pan is particularly beneficial for performing a hybrid steaming and baking method as disclosed in U.S. patent applications Ser. Nos. 08/681,113 filed Jul. 22, 1996 and 08/884,345 filed Jun. 27, 1997, now U.S. Pat. Nos. 5,776,532 and 5,800,853, respectively. In this hybrid method, a food item is subjected to both steaming and baking during a first portion of a cooking cycle, with the steam coming only from beneath the food item. In a second portion of the cooking cycle, the food item is further subjected only to conventional baking to develop the desirable surface color and crust. A fixed amount of water is added into a steam generating chamber located between two metal pans (upper and bottom pans), and the water is converted into steam by absorbing heat from an oven. The duration of the first portion of the cooking cycle (steaming) is dependent upon the amount of water added into the steam generating chamber and the rate of vaporization.

The rate of vaporization in such a baking pan can be affected by parameters such as the distance between the heat source and the baking pan, the temperature of the oven, the type and size of the oven (gas, electric, convection or toaster oven), and the material of the baking pan and its thickness. In order to more easily control the hybrid steaming and baking process so as to produce multiple cooked food products of substantially uniform characteristics, it is desirable to minimize the effects of these parameters on the baking pan. An extra heating element, with constant output wattage and a separate temperature control circuit (on/off switch and thermostat), can be incorporated into, or placed in close proximity to, the baking pan for generating steam at a preferred rate. In the latter case, there should be a good physical contact between the extra heating element and the bottom of the baking pan for fast heat transfer. The integrated bottom pan is continuously movable when it is placed on an adjustable shelf.

DESCRIPTION OF THE PREFERRED EMBODIMENTS

Figure 1:
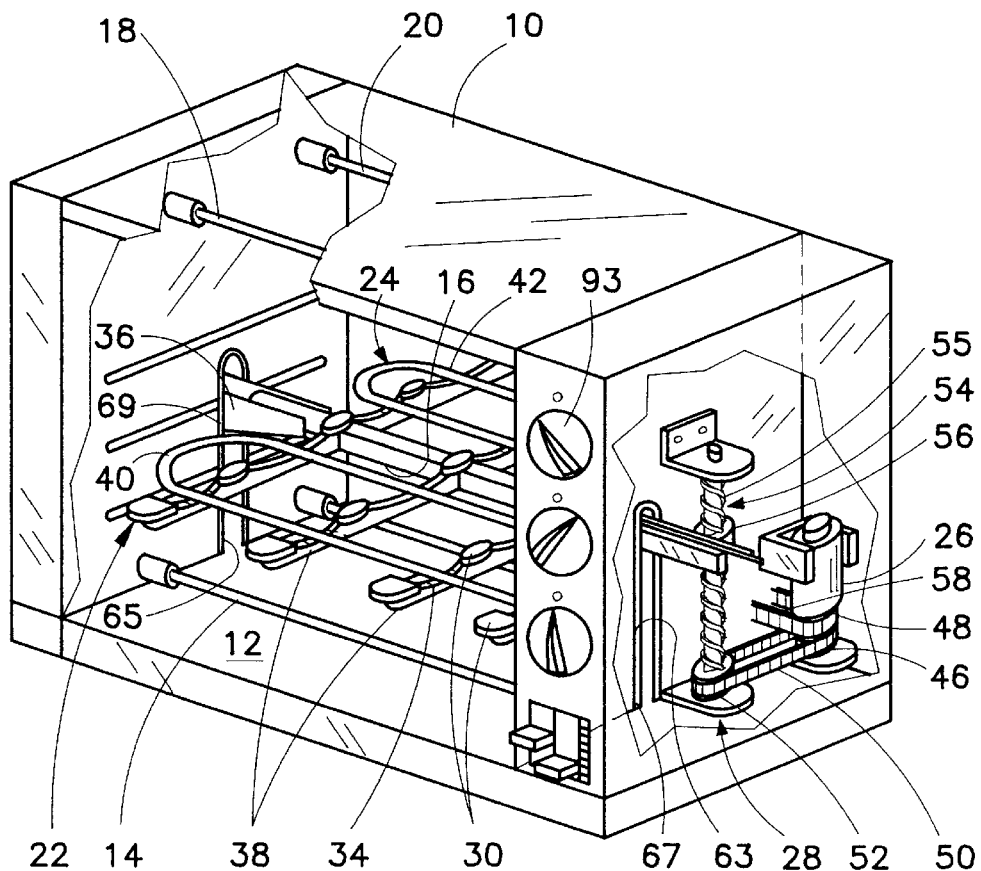
FIG. 1 is an isometric view, partly broken away, of an oven in accordance with the present invention, showing a movable shelf with a heating element and a drive for automatically moving the shelf and the heating element.
Figure 2:
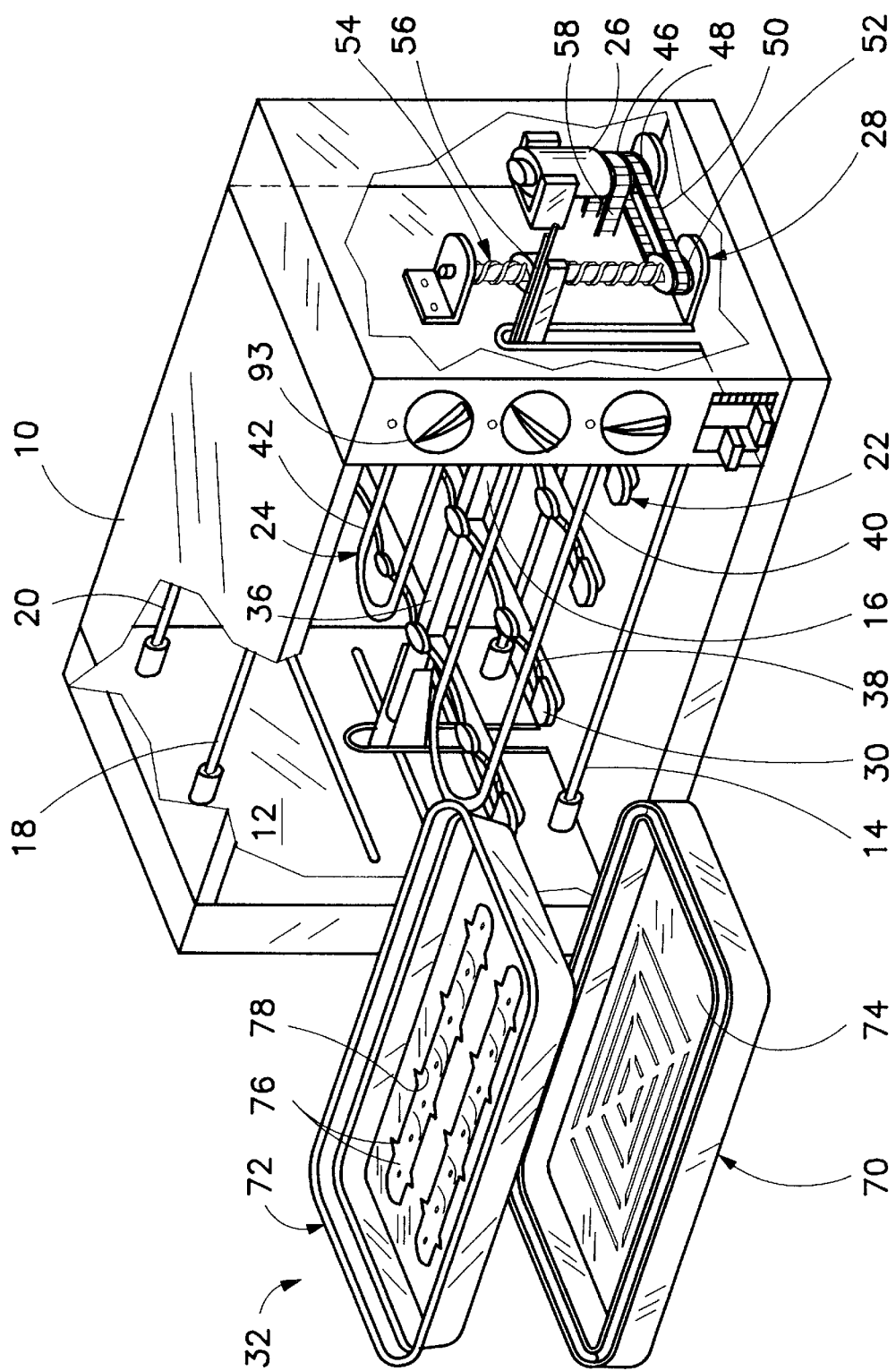
FIG. 2 is an isometric view, partly broken away, of an oven assembly including the oven of FIG. 1 and a two part baking pan.

As illustrated in FIGS. 1 and 2, a domestic oven comprises a housing 10 defining a cooking chamber 12. Two resistive-type heating elements 14 and 16 are fixed at the bottom of chamber 12, while another two resistive heating elements 18 and 20 extend across an upper end of chamber 12. A shelf 22 in the form of a lattice for supporting foodstuffs is movably disposed in chamber 12. Shelf 22 carries a resistive heating element 24 and is operatively coupled to a reversible drive motor 26 via a mechanical power transmission train 28. Motor 26 and transmission train 28 serve to automatically translate or reciprocate shelf 22, together with heating element 24, in a vertical direction in housing 10.

Figure 4:
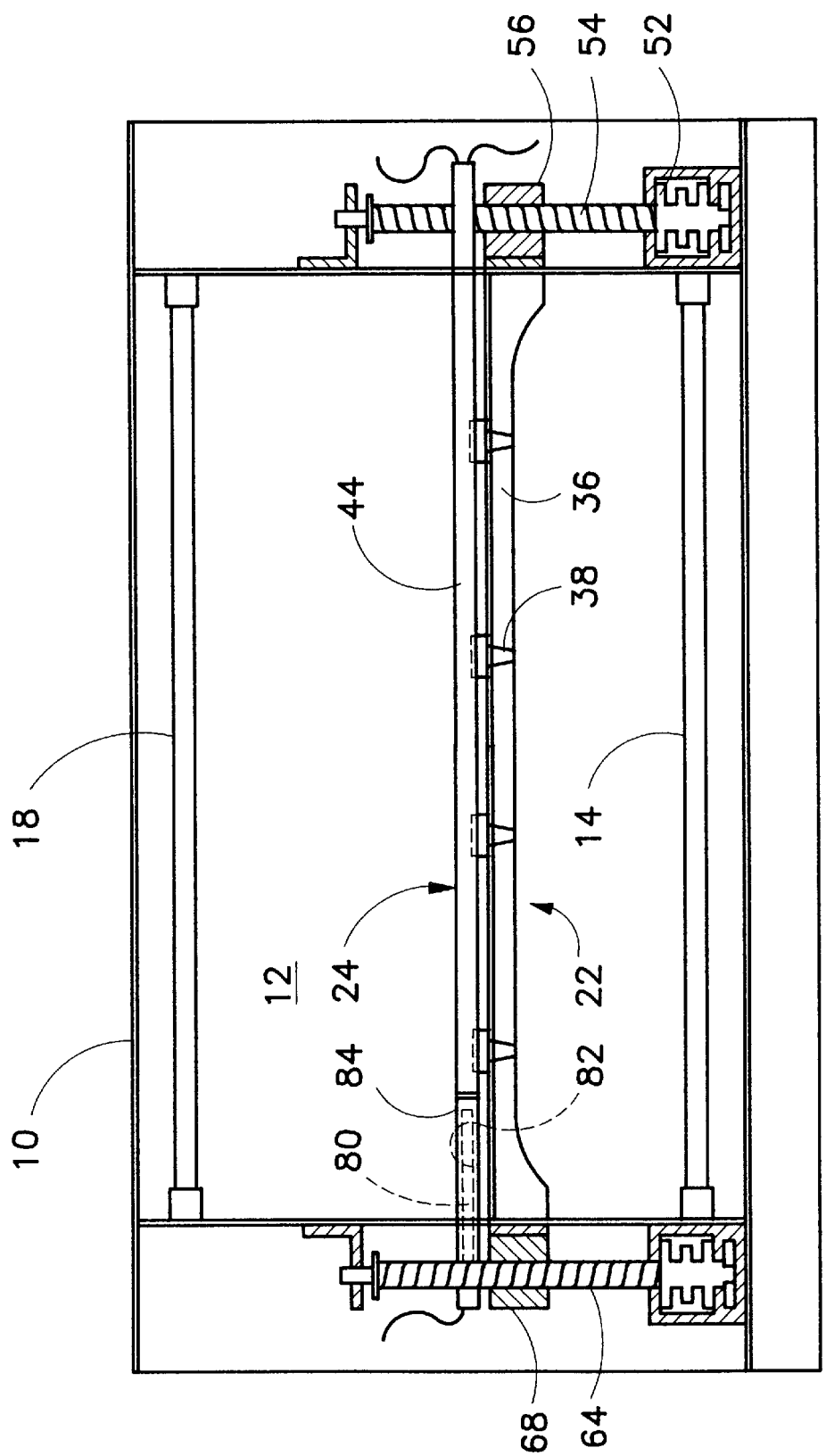
FIG. 4 is a cross-sectional view of the shelf and the heating element of FIGS. 1–3, showing a power transmission portion of the drive of FIGS. 1 and 2.

Preferably, shelf or lattice 22 is made of heat conductive metal such as aluminum or iron. Shelf 22 is provided with a plurality of land surfaces 30 for receiving and supporting a baking tray or pan 32 (FIG. 2). Land surfaces 30 ensure good thermal contact between pan 32 and the shelf, to facilitate monitoring of the temperature of the pan. In contrast, heating element 24 is supported on shelf 22 by means of thermally insulating spacers 34 (FIG. 4). Spacers 34 also facilitates a monitoring of the temperature of pan 32, by isolating the temperature detection process from the heat of heating element 24.

Figure 3:
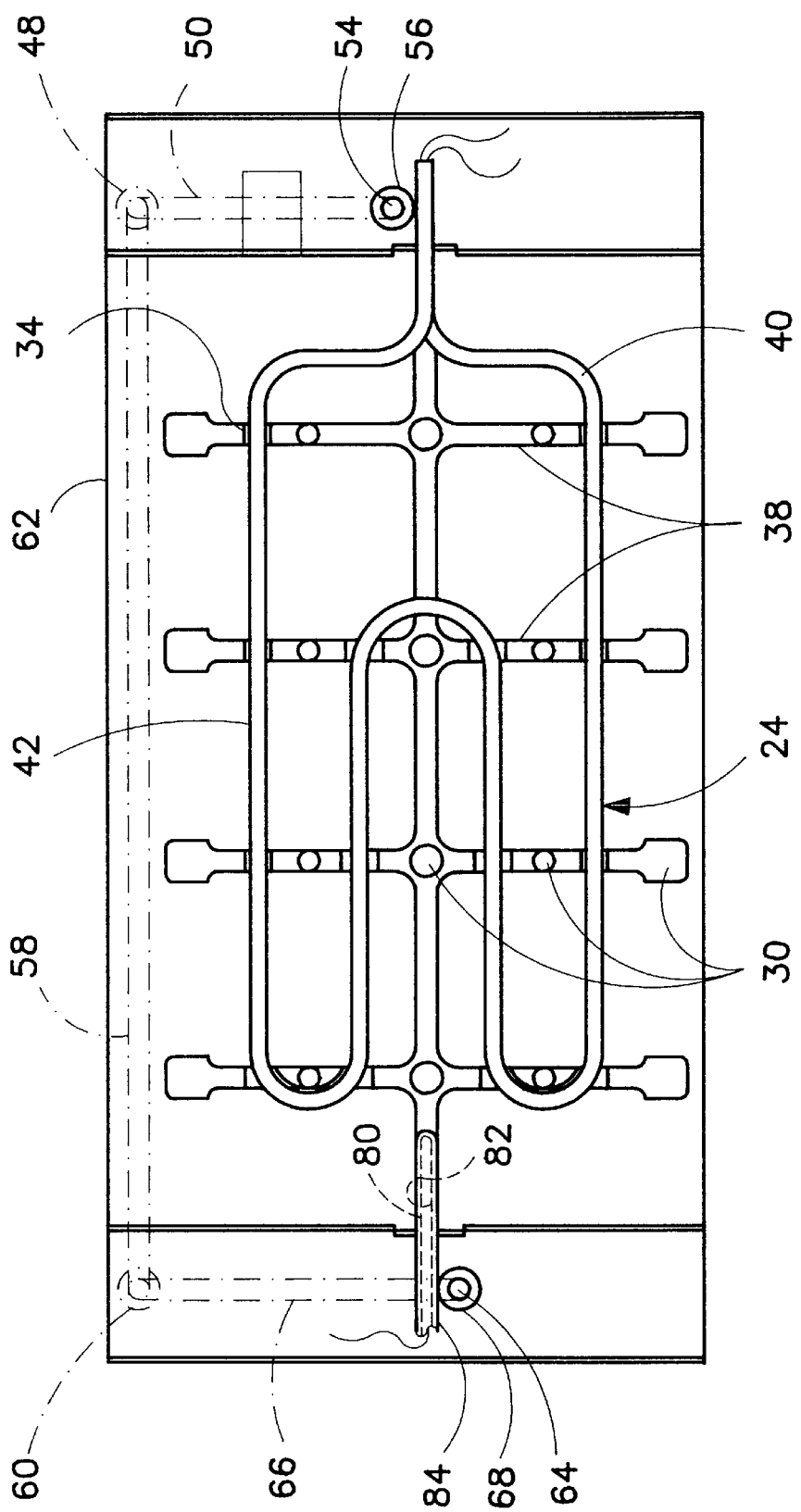
FIG. 3 is a top view of the shelf and the heating element of FIGS. 1 and 2.

As shown in FIGS. 1–3, shelf 22 comprises a central longitudinal member 36 with a plurality of transversely extending ribs 38 extending therefrom. Ribs 38 support heating element 24 which comprises two elongate lobes 40 and 42 extending parallel to one another in the manner of fork prongs. Heating element 24 has a circular cross-section (not shown) and an upper rim 44 disposed in a common plane P1 (FIG. 4) with land surfaces 30. Thus, pan 32 when placed on shelf 22 is in contact not only with land surfaces 30 but also rim 44 of heating element 24.

Power transmission train 28 includes a pair of pulleys 46 and 48 connected to a drive shaft (not shown) of motor 26. A first endless chain 50 is partially wound around pulley 46 and extends to another pulley 52 at the base of a rotatable shaft 54 formed with a helical external thread 55. Shaft 54 is drivingly mated with an internally threaded collar 56 which is fastened to shelf 22 and particularly to elongate longitudinal member 36 thereof.

Power transmission train 28 further includes a second endless chain 58 (FIGS. 1–3) partially surrounding pulley 48 at one end and another pulley 60 at an opposite end. Chain 58 extends along a back side 62 of oven housing 10 and transmits mechanical rotary power from motor 26 to another vertically extending rotatable shaft 64 (FIG. 4) via an additional endless chain 66. Shaft 64 is externally threaded and mates with an internally threaded collar 68 in turn fastened to an end of longitudinal lattice member 36 at an end thereof opposite collar 56.

Housing 10 is provided with a pair of vertical slots 63 and 65 communicating with chamber 12 and traversed by elongate longitudinal member 36 of shelf 22. Slots 63 and 65 are provided with respective self-sealing closures 67 and 69 made, for instance, of polymeric material, for reducing heat loss.

Upon the energization of motor 26, transmission 28 drives shelf 22 in an upward or downward direction, depending on the direction of rotation of the motor's rotor. The energization of motor 26 and the consequent shifting of shelf 22 and heating element 24 may occur before, during or after a heating cooking cycle of the oven. For example, after a food article (not shown) has been placed on pan 32 and then deposited with the pan onto shelf 22, heating element 24 may be energized to cook a lower surface of the food article in contact with pan 32. During or after this heat transfer process, motor 26 may be energized to lift shelf 22, heating element 24, pan 32 and the food article into proximity with upper heating elements 18 and 20.

As depicted in FIG. 2, baking pan 32 includes a lower pan part 70 and an upper pan part 72 which are removably interconnectable in a steam tight fit. The two pan parts 70 and 72 define a steam generating chamber 74. A plurality of steam guiding apertures 76 are provided in an upper surface of pan 32 and particularly in depressions 78 formed in upper pan part 72. Apertures 76 communicate with steam generating chamber 74 for purposes of delivering steam from that chamber to a lower surface of a food article such as a lump of dough (not shown) placed over the apertures.

In using the baking pan and oven combination of FIG. 2, a food article such as a lump of dough is placed on upper pan part 72 over apertures 76. In addition, a predetermined aliquot of water and possibly a flavoring composition are placed into steam generating chamber 74 of pan 32. Pan 32 with the water, the food article and the optional flavoring composition is placed in oven chamber 12 on top of shelf 22, in engageent with land surfaces 30 and in close proximity to or in contact with heating element 24 an d particularly rim 44. Heating element 24 may be turned on or energized at t his juncture or at a prior time. In addition, the position of shelf 22, with heating element 24 and pan 32 and the food article, is adjusted to an appropriate distance from lower heating elements 14 and 16 and upper heating elements 18 and 20. This adjustment may be effectuated prior to or after the disposition of pan 32 and the food article on shelf 22.

During a first phase of a hybrid steaming and baking cycle, heating element 22 is energized for rapidly and efficiently increasing the temperature of the pan to convert the water into steam. The steam exits the steam generating chamber 74 through apertures 76 and moistens the lower surface of the food article, thereby preventing hardening thereof. In addition, the steam enters the food a rticle, particularly where the food article is a doughy composition, and cooks the inside of the food article. Also during the first phase of the hybrid steaming and baking cycle, main heating elements 14,1 6, 18, and/or 20 are energized to produce baking temperatures in the oven chamber 12. Once the water is used up, the steaming process terminates. However, baking, continues generally for a predetermined interval to finish browning of cooking of the food article. This hybrid steaming and baking process, as well as modifications in baking pan 32 and the cooking process, are described in U.S. patent appication Ser. No. 08/681,113 filed Jul. 22, 1996, now U.S. Pat. No. 5,776,532 and U.S. patent application Ser. No. 08/884,345 filed Jun. 27, 1997, now U.S. Pat. No. 5,800,853. The disclosures of those allowed applications are incorporated by reference herein.

In a modification of baking pan 32 described and illustrated in U.S. patent application Ser. No. 08/884,345 filed Jun. 27, 1997, now U.S. Pat. No. 5,800,853, a lower pan part and an upper pan part are connected to one another via a steam tight seal, while the upper pan part is provided with an opening and a replaceable panel provided with the steam apertures is mounted in a steam-tight fit in the opening. This modified baking pan is part of a kit which is useful not only in the hybrid steaming and baking process discussed above but also in numerous other steaming, baking, broiling, and toasting processes which may be performed with the oven of FIG. 1.

Figure 5:
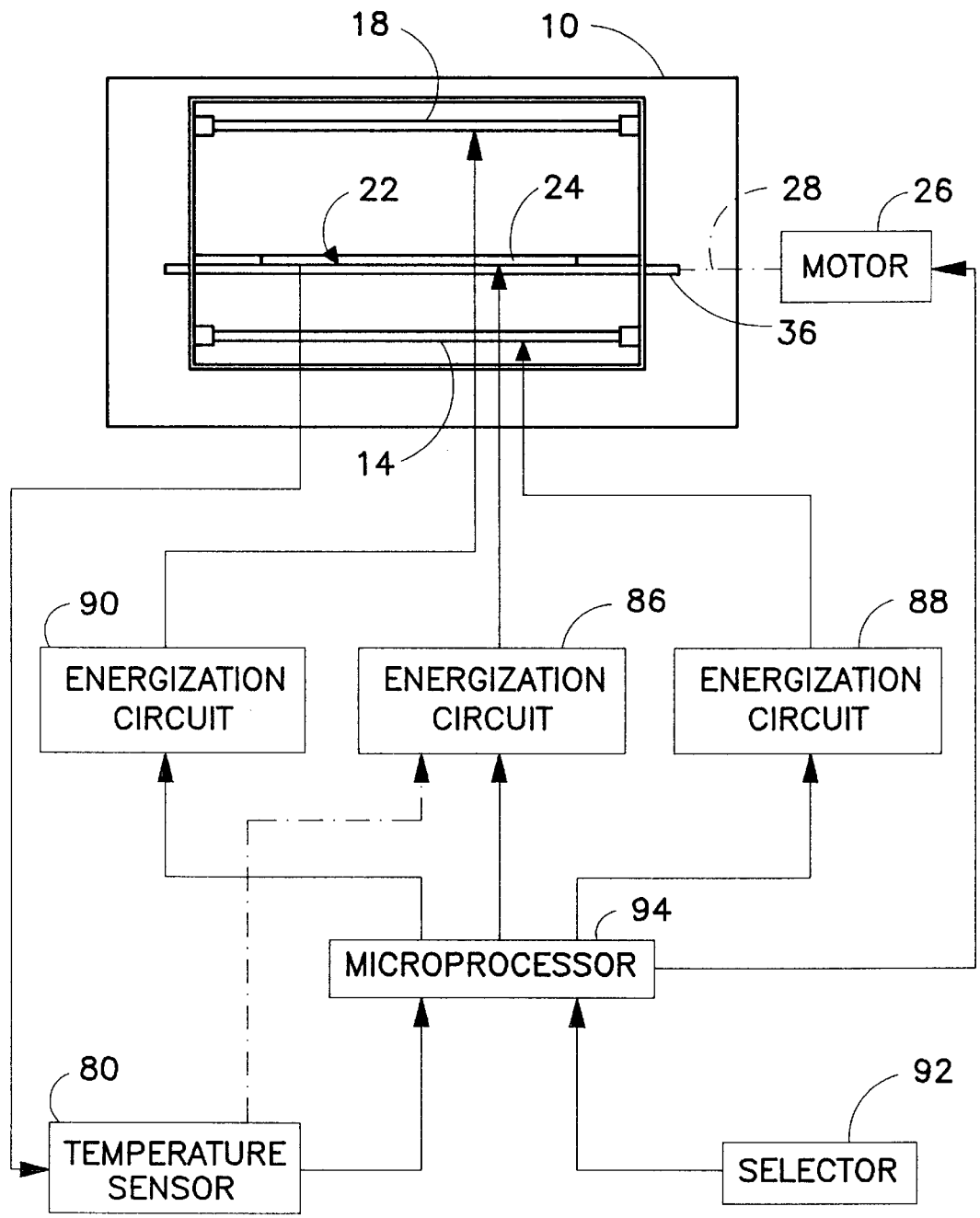
FIG. 5 is a block diagram of a circuit included in the oven of FIGS. 1 and 2.

As depicted in FIGS. 3–5, a temperature sensor 80 is provided in heat conductive contact with shelf 22 for sensing the temperature of the shelf and of pan 32 placed on shelf 22 in heat conductive contact therewith. Temperature sensor 80 is located in a recess 82 provided in or on shelf 22. More specifically, a metal sleeve 84 which defines recess 82 is attached to shelf 22 for receiving sensor 80 so that the sensor is in heat conductive contact with the shelf. Temperature sensor 80 is operatively connected to an energization circuit 86 (FIG. 5) in turn connected to heating element 24. Upon detection of a sudden temperature rise by sensor 80, energization circuit 86 ceases its energizing of heating element 24, thereby ceasing the transfer of steam-converting energy to pan 32. As discussed above, heating element 24 is mounted to shelf 22 via insulating spacers. This facilitates the detection of the temperature of pan 32 rather than of heating element 24 itself, heat being transferred from the pan to shelf or lattice 22 via land surfaces 30.

As depicted in FIG. 5, lower heating elements 14 and 16 and upper heating elements 18 and 20 (FIGS. 1 and 2) are also provided with their own dedicated energization circuits 88 and 90. Energization circuits 86, 88, and 90 are set or controlled in response to actuation of a manual selector 92 such as a keypad or dials (see reference designation 93 in FIGS. 1 and 2). Microprocessor 94 may be connected to selector 92 and energization circuits 86, 88 and 90, as well as to drive motor 26 and sensor 80, for controlling the circuits and the drive in response to a user's instructions and input from sensor 80 and in accordance with predetermined stored cooking programs. Each heating element 24, 14 and 16, and 18 and 20 is separately controllable by its respective energization circuit 86, 88, and 90 and optionally microprocessor 94 to carry out a respective cooking program. In many cooking processes, energization circuits 86, 88, and 90 are operated in a coordinated manner to effectuate a controllably simultaneous or staggered heating of a food article. For example, energization circuit 88 or 90 may be operatively connected to its respective heating elements 14 and 16 or 18 and 20 for energizing those heating elements during a baking cycle which overlaps a steaming cycle and which continues after termination of the steaming cycle in response to input from temperature sensor 80. Microprocessor 94 may control the activation of shelf drive motor 26 pursuant to preprogrammed and preselected directions. For instance, upon receiving a signal from temperature sensor 80 indicating that a steaming process is over, microprocessor may activate motor 26 and transmission train 28 to move shelf 22 to a higher position in oven chamber 12 closer to upper heating elements 18 and 20, thereby browning or crisping upper surfaces of the food article on pan 32. In general, preprogrammed cooking sequences, stored in a memory of microprocessor 94, are followed to cook food items of known composition and size or weight.

In another embodiment of the present invention, the second heating element is incorporated into a tray or pan and is removably mounted to the shelf. More specifically, the second heating element is incorporated into a lower part of the tray or pan which defines, together with an upper part a steam generating chamber. The second heating element and the shelf are provided with mating electrical connectors for supplying electrical energy to the heating element.

Figure 6:
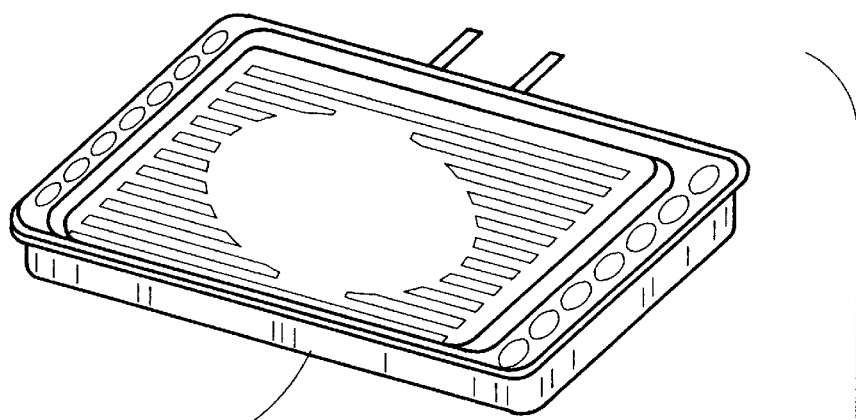
FIG. 6 is an exploded view of a baking pan in accordance with the present invention.
Figure 6:
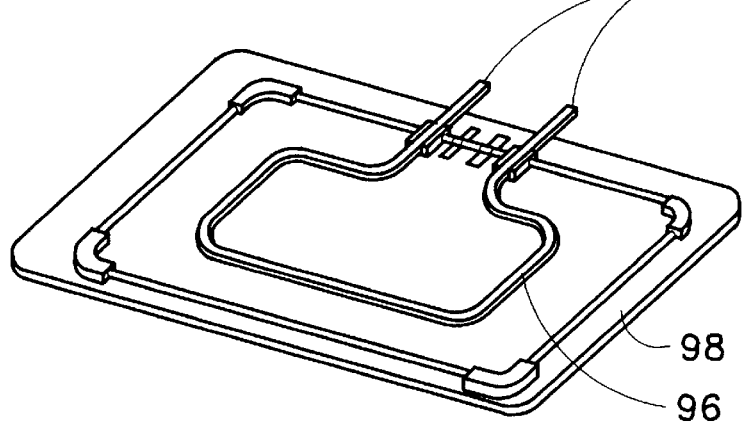
Figure 7:
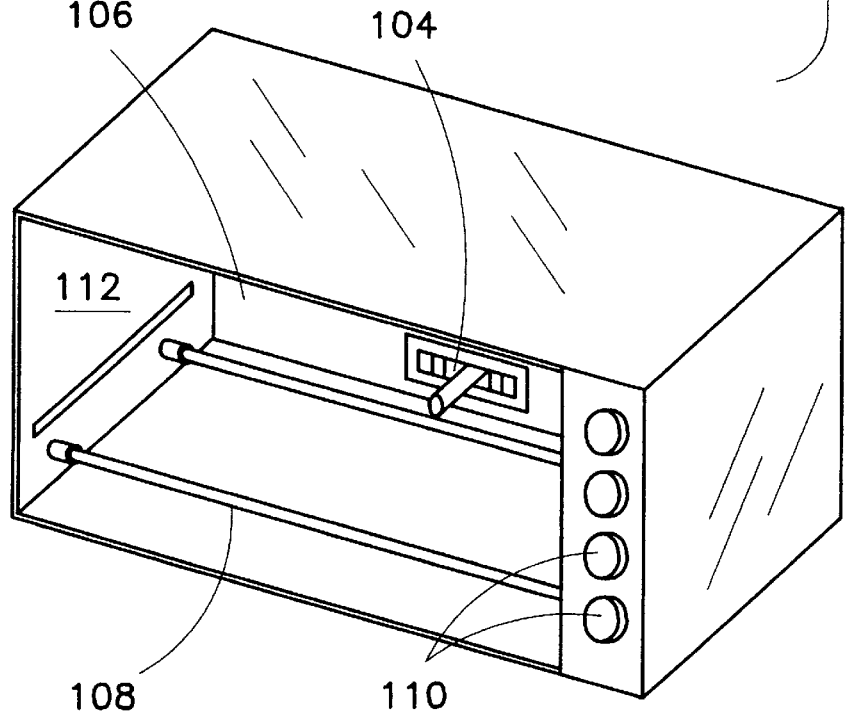
FIG. 7 is a schematic isometric view of an oven in accordance with the present invention, for use with the baking pan of FIG. 6.

In an alternative oven assembly including a two-part cooking tray or pan illustrated in FIG. 6 and an oven depicted in FIG. 7, a heating element 96 is incorporated into a lower part 98 of the tray or pan. Heating element 96 may be firmly attached to an upper surface of the lower pan part 98, as shown particularly in FIG. 6, or may be embedded in the material of the lower pan part (not shown). An upper pan part 100 with or without steam apertures (not shown) is attachable to lower pan part 98 over heating element 96. Heating element 96 has a pair of male terminals 102 for mating connection to a female outlet or terminal 104 disposed on an inner panel 106 of the oven of FIG. 7. The oven has conventional lower heating elements 108 and upper heating elements (not illustrated), as well as manual selectors 110 and energization circuits (not shown) for energizing the heating elements 96 and 108 pursuant to a user's wishes. In this oven assembly, the cooking tray or pan of FIG. 6 is stationary with respect to a cooking chamber 112 of the oven of FIG. 7.

Although the invention has been described in terms of particular embodiments and applications, one of ordinary skill in the art, in light of this teaching, can generate additional embodiments and modifications without departing from the spirit of or exceeding the scope of the claimed invention. For example, it is possible for the shelf, i.e., the lattice or support structure thereof, to be made of a non-conductive material such as ceramic. It that case, the heating element could operate in accordance with a principle other than resistive heating of the heating element. One such alternative principle is magnetic: the heating element generates oscillating magnetic fields in the food tray or baking pan, thereby heating the baking pan by magnetically induced resistive heating. The temperature of the pan or tray must be measured by a temperature sensor which is placed in direct contact with the tray or pan or by a detector other than a conventional thermocouple-type temperature sensor, for example, an infrared sensor.

In equivalent configurations of motor 26 and transmission train 28, motor 26 is disposed, for example, at an intermediate position between pulleys 46 and 52 or in the region of pulley 60. Chains 50, 58, 66 may be replaced by endless belts. Racks and pinions may be substituted for shafts 54 and 64 and collars 56 and 68. The entire drive including motor 26 and transmission train 28 may be omitted in favor of a pneumatic or hydraulic drive.

Accordingly, it is to be understood that the drawings and descriptions herein are proffered by way of example to facilitate comprehension of the invention and should not be construed to limit the scope thereof.

What is claimed is:

1. A domestic oven comprising:

a housing defining a cooking chamber;

at least one stationary first heating element in said chamber;

a shelf movably disposed in said chamber;

a second heating element mounted to said shelf; and a drive operatively connected to said shelf for translating said shelf, together with said second heating element, in said housing.

2. The oven defined in claim 1 wherein said shelf is made of heat conductive metal.

3. The oven defined in claim 2 wherein said shelf is provided with a temperature sensor in heat conductive contact with said shelf.

4. The oven defined in claim 3, further comprising an energization circuit operatively connected to said second heating element, said temperature sensor being operatively connected to said energization circuit for de-energizing said second heating element upon detecting a sudden rise in temperature.

5. The oven defined in claim 4 wherein said second heating element is mounted to said shelf via insulating spacers.

6. The oven defined in claim 5 wherein said shelf is provided with a plurality of land surfaces for receiving a tray or pan containing a food product to be cooked.

7. The oven defined in claim 6 wherein said land surfaces define a horizontal plane, said second heating element being disposed on top of said shelf, said second heating element having an upper surface or rim located in approximately said plane.

8. The oven defined in claim 5 wherein said second heating element is a resistive type heating element.

9. The oven defined in claim 5 wherein said second heating element is disposed on top of said shelf.

10. The oven defined in claim 3 wherein said shelf is provided with a recess for receiving said temperature sensor so that said sensor is in heat conductive contact with said shelf.

11. The oven defined in claim 10 wherein said recess is defined by a heat-conductive sleeve attached to said shelf.

12. The oven defined in claim 1 wherein said shelf and said drive are operatively connected to one another for reciprocating said shelf in a vertical direction in said chamber.

13. The oven defined in claim 12 wherein said drive includes a motor mounted to said housing and disposed outside said chamber, said housing being provided with at least one vertical slot communicating with said chamber and traversed by a drive rod connected to said shelf, said slot being provided with a self-sealing closure.

14. The oven defined in claim 1, further comprising a baking pan disposed on said shelf, said baking pan including a steam generating chamber and at least one aperture in an upper surface in communication with said steam generating chamber for delivering steam to a lower surface of a food article placed over said aperture.

15. The oven defined in claim 14 wherein said baking pan includes a lower pan part and an upper pan part, said upper pan part including said upper surface, said lower pan part and said upper pan part being connected to one another via a steam tight seal.

16. The oven defined in claim 14 wherein said baking pan is in heat conductive contact with said shelf, said shelf being provided with a temperature sensor in heat conductive contact with said shelf, further comprising an energization circuit operatively connected to said second heating element, said temperature sensor being operatively connected to said energization circuit for de-energizing said second heating element upon detecting a sudden rise in temperature.

17. The oven defined in claim 16, also comprising an additional energization circuit operatively connected to said first heating element for energizing said first heating element during a baking cycle overlapping a steaming cycle and continuing after termination of said steaming cycle by said temperature sensor.

18. The oven defined in claim 14 wherein said baking pan includes a lower panel provided with a recess communicating with said steam generating chamber and receiving a predetermined quantity of water prior to a steaming and baking operation in said housing.

19. The oven defined in claim 14 wherein said upper surface is provided with a depression, said aperture being located in said depression.

20. The oven defined in claim 1, further comprising a first energization circuit operatively connected to said first heating element and an independent second energization circuit operatively connected to said second heating element.

21. The oven defined in claim 20 wherein said shelf is provided with a temperature sensor in heat conductive contact with said shelf, said temperature sensor being operatively connected to said second energization circuit for automatically de-energizing said second heating element upon detecting a sudden rise in temperature of said shelf.

22. The oven defined in claim 1 wherein said second heating element is mounted to said shelf via insulating spacers.

23. The oven defined in claim 1 wherein said shelf is provided with a plurality of land surfaces for receiving a tray or pan containing a food product to be cooked.

24. The oven defined in claim 23 wherein said land surfaces define a horizontal plane, said second heating element being disposed on top of said shelf, said second heating element having an upper surface or rim located in approximately said plane.

25. The oven defined in claim 1 wherein said second heating element is a resistive type heating element.

26. The oven defined in claim 1 wherein said shelf is provided with a recess for receiving a temperature sensor so that said sensor is in heat conductive contact with said shelf.

27. The oven defined in claim 26 wherein said recess is defined by a heat-conductive sleeve attached to said shelf.

28. The oven defined in claim 1 wherein said second heating element is incorporated into a tray or pan and is removably mounted to said shelf, said second heating element and said shelf being provided with mating electrical connectors for supplying electrical energy to said heating element.

29. The oven defined in claim 28 wherein said second heating element is incorporated into a lower part of said tray or pan, said tray or pan including an upper part defining, with said lower part, a steam generating chamber.

30. A cooking method comprising:

disposing a tray or pan and a food article on a movable shelf in a domestic-type oven so that said food article is supported on said tray or pan and so that said tray or pan is in turn supported on said shelf;

operating a drive to automatically move said shelf together with a heating element mounted to said shelf; and energizing said heating element while said food article is disposed on said tray or pan in said oven.

31. The method defined in claim 30, further comprising generating steam in a chamber internal to said tray or pan and dispensing the steam through at least one aperture disposed in an upper surface of said tray or pan, said food article being deposited over said aperture.

32. The method defined in claim 31, further comprising energizing another heating element in said oven while said food article is disposed on said tray or pan.

33. The method defined in claim 32 wherein said another heating element is located at a bottom of said oven, resulting in a baking of said food article.

34. The method defined in claim 32 wherein said another heating element is located above said shelf in said oven, resulting in a browning of an upper surface of said food article.

35. The method defined in claim 32 wherein the energizing of said another heating element occurs during and after the generating of said steam.

36. The method defined in claim 31, further comprising depositing a predetermined aliquot of water into said chamber prior to the generating of said steam, said steam being generated from said aliquot of water mainly owing to heat from said heating element.

37. The method defined in claim 30 wherein the disposing of said tray or pan and said food article on said shelf includes depositing said food article on said tray or pan prior to disposing said tray or pan, together with said food article, on said shelf in said oven.

38. The method defined in claim 30 wherein the moving of said shelf occurs during energizing of said heating element.

39. The method defined in claim 30 wherein the moving of said shelf occurs prior to the disposing of said tray or pan and said food article on said shelf.

40. The method defined in claim 30 wherein the moving of said shelf occurs after the disposing of said tray or pan and said food article on said shelf.

41. The method defined in claim 30, further comprising terminating the energizing of said heating element and continuing to cook said food article in said oven.

42. The method defined in claim 30, further comprising energizing another heating element in said oven while said food article is disposed on said tray or pan.

43. A cooking assembly comprising:
- an oven having a baking chamber defined by a plurality of wall panels;
- a first electrical connector mounted to one of said panels;
- a tray or pan having an upper part and a lower part together defining a steam generating chamber;
- a heating element incorporated into said lower part of said tray or pan; and
- a second electrical connector permanently connected to said heating element and removably connected to said first electrical connector.

44. The cooking assembly defined in claim 43 wherein said tray or pan is provided with at least one aperture in an upper surface in communication with said steam generating chamber for delivering steam to a lower surface of a food article placed over said aperture.

45. The cooking assembly defined in claim 44 wherein said tray or pan includes a lower part and an upper part, said upper part including said upper surface, said lower part and said upper part being connected to one another via a steam tight seal.

46. The cooking assembly defined in claim 43, further comprising a temperature sensor and an energization circuit, said energization circuit being operatively coupled to said first electrical connector for energizing said heating element, said temperature sensor being in heat conductive contact with said tray or pan and in operative contact with said energization circuit for terminating the energizing of said heating element upon a sudden rise in detected temperature of said tray or pan.

* * * * *